United States Patent [19]
Kolouch

[11] Patent Number: 6,166,138
[45] Date of Patent: Dec. 26, 2000

[54] FLUOROPOLYMER COMPOSITION

[75] Inventor: Robert Joseph Kolouch, Vienna, W. Va.

[73] Assignee: E. I. du Pont de Nemours and Company, Wilmington, Del.

[21] Appl. No.: 09/114,636

[22] Filed: Jul. 13, 1998

Related U.S. Application Data

[60] Provisional application No. 60/058,286, Sep. 9, 1997.
[51] Int. Cl.⁷ .............................. C08L 67/02; C08L 27/12
[52] U.S. Cl. ......................... 525/166; 525/199; 525/200; 525/326.4
[58] Field of Search ................................ 525/166, 326.4, 525/199, 200

[56] References Cited

U.S. PATENT DOCUMENTS

| | | | |
|---|---|---|---|
| 4,975,495 | 12/1990 | Rossbach et al. | 525/340 |
| 5,670,593 | 9/1997 | Araki et al. | 526/245 |
| 5,750,626 | 5/1998 | Shimizu et al. | 525/151 |
| 5,780,552 | 7/1998 | Kerbow | 525/276 |

FOREIGN PATENT DOCUMENTS

| | | | |
|---|---|---|---|
| 0 626 424 A1 | 12/1993 | European Pat. Off. | C08L 27/12 |
| 0 709 428 A1 | 4/1995 | European Pat. Off. | C08L 27/12 |
| 0 728 776 A1 | 6/1995 | European Pat. Off. | C08F 214/18 |
| 0 761 757 A1 | 8/1996 | European Pat. Off. | C08L 51/00 |
| 0761757 | 3/1997 | European Pat. Off. | |

*Primary Examiner*—Ana Woodward
*Attorney, Agent, or Firm*—Thomas W Steinberg

[57] ABSTRACT

Fluoropolymer compositions containing melt-fabricable functionalized fluoropolymer and liquid crystal polymer have enhanced adhesion to metal even at low concentrations of liquid crystal polymer.

9 Claims, No Drawings

FLUOROPOLYMER COMPOSITION

RELATED APPLICATION

This application claims the benefit of Provisional Application No. 60/058,286 filed Sep. 9, 1997.

FIELD OF THE INVENTION

This invention is in the field of melt-fabricable fluoropolymers, and is specifically concerned with melt-fabricable fluoropolymer compositions having enhanced properties.

BACKGROUND OF THE INVENTION

Fluoropolymer resins, and especially perfluoropolymer resins, are known for their low surface energy and antistick properties and thermal and chemical resistance. These copolymers do not stick to other materials, especially dissimilar materials, with any practical degree of bond strength.

Some high temperature resistant thermoplastics (HTRP), such as polyamide imide, polyarylene sulfide and polyether sulfone, have found use as adhesion promoters in fluoropolymer coating formulations. See, for example U.S. Pat. No. 5,230,961 (Tannenbaum) and U.S. Pat. No. 5,093,403 (Rau et al.). While liquid crystal polymers (LCP) have been included in HTRP groupings for other purposes, LCP are not known as adhesion promoters. While LCP can exhibit some adhesion to metal in the neat (undiluted) state, such adhesion is much less than exhibited by the recognized HTRP adhesion promoters.

There remains a need for melt-flowable fluoropolymer with improved adhesion to dissimilar materials but which substantially retains the thermal and chemical resistance of fluoropolymer.

SUMMARY OF THE INVENTION

This invention provides a melt-fabricable fluoropolymer composition comprising minor amounts of functionalized fluoropolymer and liquid crystal polymer, and a major amount of non-functional fluoropolymer. The composition exhibits synergistic enhanced adhesion to metal, enabling one to use relatively low concentrations of liquid crystal polymer to achieve adhesion, so that the composition has predominantly fluoropolymer character. Heretofore, liquid crystal polymer has not been known as an adhesion promoter.

In a further embodiment, the invention provides a laminate of metal and the melt-fabricable composition of the invention adhered thereto.

DETAILED DESCRIPTION

It has been discovered that a combination of functionalized fluoropolymer and liquid crystal polymer (LCP) results in a synergistic increase in the adhesion of the resultant fluoropolymer composition to metal. When both components are present, the adhesion result is better than would be predicted from adhesion results when only one of these components is present, and, as shown below, is better than the adhesion of neat LCP. As a result, relatively low concentrations of LCP can be used to achieve good adhesion, so that the composition has a relatively high proportion of fluoropolymer and, therefore, predominantly fluoropolymer characteristics.

As used herein, "functionalized fluoropolymer" means fluoropolymer having functional side groups or functional groups attached to side groups. Usually, but not necessarily, such functional units are at the ends of the pendant side groups. Functional groups, in the context of the present invention, are groups capable of enhancing the effect of LCP as an adhesion promoter, when functional groups and LCP are both present in a fluoropolymer composition, to achieve an adhesive bond between the fluoropolymer composition and a metal surface, e.g., to form a laminate. Such functional groups can be introduced, for example, by incorporating into the fluoropolymer, during polymerization, monomer units having such functional groups, i.e., functional monomers.

Functional groups that can enhance the effect of LCP as an adhesion promoter include ester, alcohol, acid (including carbon-, sulfur-, and phosphorus-based acid) and salt and halide thereof. Other functionalities include cyanate, carbamate, nitrile, and the like. Specific functional groups that can be used include —$SO_2F$, —CN, —COOH and —$CH_2$—Z wherein —Z is —OH, —OCN, —O—(CO)—$NH_2$, or —OP(O)(OH)$_2$. Preferred functional groups include —$SO_2F$ and —$CH_2$—Z wherein —Z is —OH, —O—(CO)—$NH_2$, or —OP(O)(OH)$_2$. The functional groups —$CH_2$—Z wherein —Z is —OH, —O—(CO)—$NH_2$ or —OP(O)(OH)$_2$ are especially preferred. As one skilled in the art will recognize, more than one type of functional group can be present. Normally, however, a single type of functional group is used.

The concentration of functional groups in the fluoropolymer resin component, i.e., in functionalized fluoropolymer plus non-functional fluoropolymer, of the melt-fabricable fluoropolymer composition of this invention is effective to enhance the effect of LCP as an adhesion promoter and thereby to enable good adhesion to metal at low LCP concentration. As will be recognized by one skilled in the art, the concentration of functional groups that is effective to enhance the effect of LCP as an adhesion promoter can vary at least with the type of functional group and with the type of LCP. The concentration of functional groups present can be expressed relative to the number of main chain carbon atoms in the fluoropolymer resin. Generally, the concentration of functional groups present is at least about $25/10^6$ main chain C atoms, based on total fluoropolymer in the composition. The concentration of functional groups is usually in the range of 25–2500 per $10^6$ main chain C atoms, preferably in the range of 50–2000 per $10^6$ main chain C atoms, based on total fluoropolymer present.

One skilled in the art will recognize that the desired concentration of functional groups in the functionalized fluoropolymer resin can be achieved with a single fluoropolymer having functional groups, or a mixture of such fluoropolymers having the same or different functional groups. However, a single fluoropolymer having only one type of functional group is normally used.

Likewise, the non-functional fluoropolymer component of the composition can be a blend of non-functional fluoropolymers.

Thus, in the present invention, the melt-fabricable fluoropolymer composition contains minor amounts of functionalized fluoropolymer and liquid crystal polymer resin, and a major amount of non-functional fluoropolymer. By "major amount" is meant at least 50 wt %, preferably at least 70 wt %, of non-functional fluoropolymer based on combined weight of non-functional fluoropolymer, functional fluoropolymer, and LCP. The composition preferably contains 1–30 wt %, more preferably 1–20 wt %, most preferably 3–15 wt %, of functionalized fluoropolymer and 0.5–15 wt %, more preferably 1–10 wt %, of LCP, based on combined weight of non-functional fluoropolymer, functionalized fluoropolymer, and LCP. Such LCP contents are generally lower than other HTRP contents of compositions in which the other HTRP is present for adhesion promotion. The concentration of functional groups in the functionalized fluoropolymer alone will be higher than recited above for total fluoropolymer according to the amount of non-functional fluoropolymer present in the blend.

Fluoropolymer resins that can be used include copolymers of TFE with one or more copolymerizable monomers chosen from perfluoroolefins having 3–8 carbon atoms and perfluoro(alkyl vinyl ethers) (PAVE) in which the linear or branched alkyl group contains 1–5 carbon atoms. Preferred perfluoropolymers include copolymers of TFE with at least one of hexafluoropropylene (HFP) and PAVE. Preferred comonomers include PAVE in which the alkyl group contains 1–3 carbon atoms, especially 2–3 carbon atoms, i.e. perfluoro(ethyl vinyl ether) (PEVE) and perfluoro(propyl vinyl ether) (PPVE). Additional fluoropolymers that can be used include copolymers of ethylene with TFE, optionally including minor amounts of one or more modifying comonomer such as perfluorobutyl ethylene. Representative fluoropolymers are described, for example, in ASTM Standard Specifications D-2116, D-3159, and D-3307. Such fluoropolymers are non-functional fluoropolymers if they have essentially no functional groups, but are functionalized fluoropolymers if functional groups are added, e.g., by grafting. Preferred fluoropolymers are perfluoropolymers, except for functional units or groups. Alternatively or additionally, preferred fluoropolymers are non-elastomeric, as opposed to elastomeric.

Functionalized fluoropolymers include fluoropolymers such as those described in the foregoing paragraph and additonally containing copolymerized units derived from functional monomers. If the concentration of functional monomer is high enough in a TFE copolymer, however, no other comonomer may be needed. Usually, but not necessarily, the functional groups introduced by such monomers are at the ends of pendant side groups. Functional monomers that introduce pendant side groups having such functionality can have the general formula $CY_2=CY-Z$ wherein Y is H or F and Z contains a functional group. Preferably, each Y is F and —Z is —$R_f$—X, wherein $R_f$ is a fluorinated diradical and X is a functional group that may contain $CH_2$ groups. Preferably, $R_f$ is linear or branched perfluoroalkoxy having 2–20 carbon atoms, so that the functional comonomer is a fluorinated vinyl ether. Examples of such fluorovinylethers include $CF_2=CF[OCF_2CF(CF_3)]_m—O—(CF_2)_n CH_2OH$ as disclosed in U.S. Pat. No. 4,982,009 and the alcoholic ester $CF_2=CF[OCF_2CF(CF_3)]_m—O—(CF_2)_n—(CH_2)_p—O—COR$ as disclosed in U.S. Pat. No. 5,310,838. Additional fluorovinylethers include $CF_2=CF[OCF_2CF(CF_3)]_m O (CF_2)_n COOH$ and its carboxylic ester $CF_2=CF[OCF_2CF(CF_3)]_m O(CF_2)_n COOR$ disclosed in U.S. Pat. No. 4,138,426. In these formulae, m=0–3, n=1–4, p=1–2 and R is methyl or ethyl. Preferred such fluorovinylethers include $CF_2=CF—O—CF_2CF_2—SO_2F$; $CF_2=CF[OCF_2CF(CF_3)]O(CF_2)_2$—Y wherein —Y is —$SO_2F$, —CN, or —COOH; and $CF_2=CF[OCF_2CF(CF_3)]O(CF_2)_2$—$CH_2$—Z wherein —Z is —OH, —OCN, —O—(CO)—$NH_2$, or —OP(O)(OH)$_2$. These fluorovinylethers are preferred because of their ability to incorporate into the polymer and their ability to incorporate functionality into the resultant copolymer.

Compounds having the formula $CF_2=CF—R_f—(CH_2)_n—X$ in which X is —OCN (cyanate), —O—(CO)—$NH_2$ (carbamate), or —OP(O)(OH)$_2$ (phosphono) can be synthesized as follows. The cyanate can be prepared in high yield by a one-step process in which known compounds having the general formula $CF_2=CF—R_f—(CH_2)_n—OH$ (I), wherein n is 1–3 and $R_f$ is perfluorolkyl or perfluoroalkoxy containing 1–20 carbon atoms, are reacted with cyanogen bromide (CNBr) or cyanogen chloride (CNCl) in the presence of non-nucleophilic base. The carbamate can be prepared from the cyanate by contacting cyanate with acid at elevated temperature for time sufficient to complete conversion of cyanate to carbamate. The phosphorus-containing compounds can be prepared in high yield by a process in which compounds (I) are reacted with $P(O)Cl_3$ or $P(O)Br_3$, either neat or in aprotic solvent, to obtain the chloride or bromide, e.g., $CF_2=CF—R_f—(CH_2)_n—OP(O)(Cl_2)$, followed by hydrolysis to obtain the acid —OP(O)—(OH)$_2$. Also see European Patent Application Publication 0 829 471 and PCT Patent Application Publication WO98/11114 with respect to preparation of these compounds.

When functionalized fluoropolymer is achieved by copolymerization, the amount of functional monomer in the functionalized fluoropolymer of this invention is small to achieve the desired concentration of functional groups, even when functionalized fluoropolymer is a blend comprising non-functional fluoropolymer. Generally, the amount of functional monomer is no more than 10 wt %, preferably no more than 5 wt %, based on total weight of functionalized fluoropolymer, i.e., the fluoropolymer component containing the functional monomer. In certain instances, higher concentrations of functional monomer approaching and even exceeding 10 wt % may be desired, for example, to achieve good bonds to substrate metal such as stainless steel, or when it is not desired to use a non-functional monomer in the functionalized melt-fabricable fluoropolymer. While the functionalized fluoropolymer can be uniform, it is not necessary to have a uniform concentration of functional monomer throughout the functionalized fluoropolymer.

The fluoropolymer composition of this invention is melt-fabricable. As such, the composition generally has melt viscosity (MV) in the range of $0.5–50 \times 10^3$ Pa·s though viscosities outside this range can be used. MV is measured according to ASTM D-1238 at the temperature appropriate for the predominant fluoropolymer component of the composition. Preferably, MV is in the range of $1–25 \times 10^3$ Pa·s. Usually, the MV of each fluoropolymer component is within the aforesaid ranges, but blending will permit a minor component to have MV in a wider range, as will be understood by one skilled in the art.

As known in the art, liquid crystal polymers (LCP), also called thermotropic LCP, are characterized by their unique ability to form regions of high molecular orientational order in the melt. This orientation can be carried over into the solid state and the orientation enhanced by appropriate processing techniques that introduce high shear or elongational stresses on the LCP during part fabrication. By "thermotropic LCP", or equivalently herein "LCP", is meant a polymer that when tested by the TOT test as described in U.S. Pat. No. 4,075,262 transmits light through crossed polarizers as described in that test procedure and is thus considered to form an anisotropic melt. Any thermotropic LCP can be used in the melt-fabricable fluoropolymer composition of this invention. Suitable LCP are described, for example in U.S. Pat. Nos. 3,991,013; 3,991,014; 4,011,199; 4,048,148; 4,075,262; 4,083,829; 4,118,372; 4,122,070; 4,130,545; 4,153,779; 4,159,365; 4,161,470; 4,169,933; 4,184,996; 4,189,549; 4,219,461; 4,232,143; 4,232,144; 4,245,082; 4,256,624; 4,269,965; 4,272,625; 4,370,466; 4,383,105; 4,447,592; 4,522,974; 4,617,369; 4,664,972; 4,684,712;

4,727,129; 4,727,131; 4,728,714; 4,749,769; 4,762,907; 4,778,927; 4,816,555; 4,849,499; 4,851,496; 4,851,497; 4,857,626; 4,864,013; 4,868,278; 4,882,410; 4,923,947; 4,999,416; 5,015,721; 5,015,722; 5,025,082; 5,086,158; 5,102,935; 5,110,896 and 5,143,956; and European Patent Application 356,226. Useful LCP include polyesters, poly (ester-amides), poly(ester-imides), and polyazomethines. Preferred thermotropic LCP are polyesters or poly(ester-amides), and it is especially preferred that the polyester or poly(ester-amide) is partly or fully aromatic. Commercial examples of LCP include the aromatic polyesters or poly (ester-amides) sold under the trademarks Zenite™ (DuPont), Vectra® (Hoechst), and Xydar® (Amoco).

The melt-fabricable fluoropolymer compositions of this invention can have various forms. They can be melt-mixed compositions, e.g., compounded using melt processing equipment of conventional design and suitably equipped for handling fluoropolymers at melt temperatures, such as twin rotor mixers and extruders with good mixing capability. The compositions can also be powder blends, or dispersion or slurry blends.

The fluoropolymer composition can be processed by means, such as known in the art, appropriate to the physical form of the composition to form a laminate or to prepare the fluoropolymer component of a laminate. Thus, for example, the composition can be extruded or injection molded, or deposited by powder coating techniques such as rotolining or electrostatic spraying if the composition is a powder, or applied by wet coating techniques such as roll coating or spraying if the composition is a dispersion, followed by drying and fusing, and the like.

The melt-fabricable fluoropolymer compositions of this invention exhibit surprisingly good adhesion to metal at low concentrations of LCP, since LCP is not known as adhesion promoter. Good adhesion is indicated by a peel strength of at least 700 g/cm, preferably at least 1000 g/cm, when measured in a peel test against aluminum as hereinafter described. Hence, the compositions are useful in laminates either as a primer or as a sole fluoropolymer component. The metal surface can be rough or smooth. The Example to follow illustrates that the melt-fabricable composition of the present invention can adhere to smooth metal surfaces. As known to those skilled in the art, the adhesion of coatings to metal can be enhanced by roughening the metal surface, e.g., by sandblasting. Generally, the metal surface should be free of dirt and grease.

EXAMPLES

Compositions were prepared for testing in laminates by melt compounding fluoropolymer resins and additives in a laboratory twin-rotor mixer with roller type rotors (Rheomix® 3000, Haake Buechler) controlled and driven by Haake's Rheocord® 40 microprocessor controlled torque rheometer. All components of a composition were charged to the mixing chamber together. Temperature and rotor speed were controlled by adjustment within the microprocessor. The product removed from the mixer after melt blending was in relatively large chunks, which were cut into small pieces suitable for molding, or, in some cases, these small pieces were ground into a powder before molding. The amount of each component in the composition is expressed in wt % based on total combined weight of stated components.

Unless otherwise stated, TFE/PPVE copolymers containing a functional monomer were used in the following Examples to illustrate the invention. These functionalized fluoropolymers were prepared by aqueous dispersion polymerization generally by the method disclosed by Gresham & Vogelpohl (U.S. Pat. No. 3,635,926) using ethane as chain transfer agent, except that a functional monomer was included in the initial charge to the reactor and buffer was not used. Functional monomers employed are defined in Table 1. Functionalized fluoropolymer solids were isolated from the raw dispersion by mechanical shear coagulation with addition of water-immiscible solvent, followed by filtering and drying. The compositions of the functionalized fluoropolymers were determined by Fourier transform infrared spectroscopy.

TABLE 1

Functional Monomer Identification

| Code | Identification or Description |
|---|---|
| EVE-OH | $CF_2=CF-[OCF_2CF(CF_3)]-$<br>$O-CF_2CF_2-CH_2-OH$<br>9,9-dihydro-9-hydroxy-perfluoro(3,6-dioxa-5-methyl-1-nonene) |
| EVE-P | $CF_2=CF-[OCF_2CF(CF_3)]-$<br>$O-CF_2CF_2-CH_2-OP(O)(OH)_2$<br>9-phosphono-9,9-dihydro-perfluoro(3,6-dioxa-5-methyl-1-nonene) |
| EVE-carbamate | $CF_2=CF-[OCF_2CF(CF_3)]-$<br>$O-CF_2CF_2-CH_2-O-(CO)-NH_2$<br>9-carbamate-9,9-dihydro-perfluoro(3,6-dioxa-5-methyl-1-nonene) |

Unless otherwise stated, the compositions prepared in the following Examples included a non-functional TFE/PPVE copolymer (PFA) which was used in cube form as supplied (Teflon® PFA fluoropolymer resin grade 340, DuPont). The peel strength measured against aluminum, as described below, for this resin alone was in the range of 185–345 g/cm.

Unless otherwise stated, LCP used in the compositions was a crystalline polyester, Zenite™ liquid crystal polymer resin grade 7000 (DuPont).

Unless otherwise stated, samples were prepared for peel strength testing as follows. A steel plate 0.060-inch (1.5-mm) thick and 8-inch (20.3-cm) square was used as the base for the laminate fabrication. A 0.040-inch (1.0-mm) thick and 8-inch square chase having a 6-inch (15.2-cm) square opening was placed on the steel plate. The chase was covered with an aluminum sheet 0.005 inch (0.13 mm) thick and 8 inches square as received from the manufacturer (A.J. Oster Co.), and a 2.5-inch (6.4-cm) wide strip of 0.002-inch (0.05-mm) thick polyimide film (Kapton®, DuPont Co.) was positioned along one edge of the aluminum so that it overlapped the opening in the chase by about 0.5 inch (1.3 cm). Then, about 65 g of the test resin composition were placed on the aluminum foil within the outline of the opening in the chase. The resin was covered with another aluminum sheet, and in turn another steel plate. This construction was then compressed in a platen press at temperature and pressure appropriate to the fluoropolymer used. After removal from the press, the laminate was placed between heavy steel plates at room temperature until cool, and then was cut into one-inch (2.5-cm) wide strips.

The peel strength values reported herein were determined as follows. The layers of the laminate strips were separated at the polyimide parting film, and fastened in the jaws of an Instron® tensile tester. The moving jaw was driven at a speed of one inch/min (2.5 cm/min) to peel the layers apart, holding the free end of the laminate taking on an angle of 180° with respect to the line of the jaws. The average force to peel the strips apart during the time interval between 30 sec and 100 sec of pulling was recorded, and is reported in force per unit width of strip.

Example 1 and Controls

The compositions summarized in Table 1 were prepared as described above. The functionalized fluoropolymer (Fcn-FP-1) employed contained 3.2 wt % of PPVE and 8.1 wt % of EVE-OH, and had MV of $1.8 \times 10^3$ Pa·s. Laminates of the compositions and aluminum sheet were prepared and peel strength was measured, also as described above. Results presented in Table 2 show that adhesion is surprisingly high for the composition containing both the functionalized fluoropolymer and the LCP. The peel strength exhibited for Example 1 is more than 50% greater than for the neat LCP, which was determined to be 1072 g/cm.

TABLE 2

Compositions and Results for Example 1

| Example/Control | A | B | 1 |
|---|---|---|---|
| Composition (wt %): | | | |
| Fcn-FP-1 | 10 | — | 10 |
| LCP | — | 10 | 10 |
| PFA | 90 | 90 | 80 |
| Properties: | | | |
| Peel strength (g/cm) | 230 | 393 | 1540 |

Example 2 and Controls

This example illustrates the present invention for compositions containing non-functional fluoropolymer other than PFA. The non-functional fluoropolymer was a TFE/HFP copolymer (FEP) satisfying ASTM D-2116 Type I (Teflon® FEP fluoropolymer resin grade 100, DuPont). The functionalized fluoropolymer (Fcn-FP-2) contained 3.6 wt % of PPVE and 3.1 wt % of EVE-OH, and had MV of $6.8 \times 10^3$ Pa·s. Compositions and results are shown in Table 3. As shown by the data, adhesion was high for the composition containing both the functionalized fluoropolymer and the LCP, showing that different fluoropolymers can be used in compositions of the invention and the functional fluoropolymer need not be the same type as the non-functional fluoropolymer.

TABLE 3

Compositions and Results for Example 2

| Example/Control | C | D | 2 |
|---|---|---|---|
| Composition (wt %): | | | |
| Fcn-FP-2 | 10 | — | 10 |
| LCP | — | 10 | 10 |
| FEP | 90 | 90 | 80 |
| Properties: | | | |
| MV ($10^3$ Pa·s) | 7.2 | 5.9 | 7.2 |
| Peel Strength (g/cm) | 122 | 0 | 2232 |

Examples 3–4 and Controls

These examples illustrate the present invention for functionalized fluoropolymers containing different functional monomers (EVE-P and EVE-carbamate). Functionalized fluoropolymer Fcn-FP-3 contained 4.3 wt % of PPVE and 0.66 wt % of EVE-P, and had MV of $1.5 \times 10^3$ Pa·s. Functionalized fluoropolymer Fcn-FP-4 contained 6.7 wt % of PEVE (instead of PPVE) and 1.1 wt % of EVE-carbamate, and had MV of $1.6 \times 10^3$ Pa·s. Compositions and results are shown in Table 4. As shown by the data, adhesion was high for the compositions containing both the functionalized fluoropolymer and the LCP.

TABLE 4

Compositions and Results for Examples 3–4

| Example/Control | E | F | 3 | G | 4 |
|---|---|---|---|---|---|
| Composition (wt %): | | | | | |
| Fcn-FP-3 | 2.5 | — | 2.5 | — | — |
| Fcn-FP-4 | — | — | — | 2.5 | 2.5 |
| LCP | — | 4.0 | 40 | — | 4.0 |
| PFA | 97.5 | 96.0 | 93.5 | 97.5 | 93.5 |
| Properties: | | | | | |
| MV ($10^3$ Pa.s) | 4.5 | 4.3 | 3.6 | 4.2 | 4.4 |
| Peel strength (g/cm) | 0 | 523 | 1,537 | 268 | 1661 |

Examples 5–6 and Controls

These examples illustrate the present invention for compositions containing different LCP resins (Zenite™ liquid crystal polymer resin grades 1000 and 6000, DuPont). Grade 6000 is less crystalline than and has a heat distortion temperature 20° C. lower than grade 7000, while grade 1000 is an amorphous LCP. The non-functional fluoropolymer was the FEP resin used in Example 2, and the functionalized fluoropolymer was Fcn-FP-2 (also Example 2). Compositions and results are shown in Table 5. Adhesion was high for the compositions containing both the functionalized fluoropolymer and LCP resin, showing that different LCP resins can be used in compositions of the invention.

TABLE 5

Compositions and Results for Examples 5–6

| Example/Control | H | I | 5 | J | 6 |
|---|---|---|---|---|---|
| Composition (wt %): | | | | | |
| Fcn-FP-2 | 10.0 | — | 9.5 | — | 9.5 |
| LCP Zenite ™ 1000 | — | 9.5 | 9.5 | — | — |
| LCP Zenite ™ 6000 | — | — | — | 9.5 | 9.5 |
| FEP | 90.0 | 90.5 | 81.0 | 90.5 | 81.0 |
| Properties: | | | | | |
| MV ($10^3$ Pa.s) | 7.2 | 5.8 | 6.8 | 6.5 | 10.4 |
| Peel Strength (g/cm) | 122 | 166 | 1725 | 675 | 1358 |

Examples 7–8 and Controls

These examples illustrates the present invention using type 321 stainless steel (SS) foil 0.002 inch (0.051 mm) thick (PTP-512, Lyon Industries) instead of aluminum as the test metal. The foil was clean as received from the manufacturer but was also cleaned with acetone and dried. The functionalized fluoropolymer (Fcn-FP-5) contained 4.3 wt % of PPVE and 1.6 wt % of EVE-OH, and had MV of $0.7 \times 10^3$ Pa·s. Compositions and results are shown in Table 6. As shown by the data, adhesion to SS was high for the composition containing both the functionalized fluoropolymer and the LCP (Zenite™ 7000).

TABLE 5

Compositions and Results for Examples 7–8

| Example/Control | K | L | 7 | M | N | 8 |
|---|---|---|---|---|---|---|
| Composition (wt %): | | | | | | |
| Fcn-FP-5 | 2.5 | — | 2.5 | 2.5 | — | 2.5 |
| LCP | — | 4.0 | 4.0 | — | 4.0 | 4.0 |
| PFA | 97.5 | 96.0 | 93.5 | 97.5 | 96.0 | 93.5 |
| Foil | Al | Al | Al | SS | SS | SS |
| Properties: | | | | | | |
| MV ($10^3$ Pa.s) | 3.8 | 4.3 | 4.5 | 3.8 | 4.3 | 4.5 |
| Peel Strength (g/cm) | 14 | 523 | 2050 | 320 | 430 | 1166 |

What is claimed is:

1. A melt-fabricable fluoropolymer composition, comprising minor amounts of functionalized fluoropolymer resin having functional groups selected from the group consisting of —SO$_2$F, and —CH$_2$—Z, wherein —Z is —OCN, —O—(CO)—NH$_2$ or —OP(O)(OH)$_2$, and mixtures thereof, and liquid crystal polymer resin and a major amount of non-functionalized fluoropolymer resin.

2. The composition of claim 1, wherein said functional group is —CH$_2$—O—(CO)—NH$_2$.

3. The composition of claim 1, wherein said functional group is —CH$_2$—OP(O)(OH)$_2$.

4. The composition of claim 1, wherein said liquid crystal polymer resin is present in the amount of 0.5–15 wt % based on combined weights of liquid crystal polymer resin, functionalized fluoropolymer resin, and non-functionalized fluoropolymer resin present.

5. A melt-fabricable fluoropolymer composition, comprising minor amounts of functionalized fluoropolymer resin containing copolymerized units derived from functional monomers having functional groups selected from the group consisting of —SO$_2$F, —CN, and —CH$_2$—Z, wherein —Z is —OCN, —O—(CO)—NH$_2$ or —OP(O)(OH)$_2$, and mixtures thereof, and liquid crystal polymer resin and a major amount of non-functionalized fluoropolymer resin.

6. The composition of claim 5, wherein the functional group of said functionalized fluoropolymer is at least one of —SO$_2$F and —CH$_2$—Z wherein —Z is —O—(CO)—NH$_2$, or —OP(O)(OH)$_2$.

7. The composition of claim 6, wherein said functional group is —CH$_2$—O—(CO)—NH$_2$.

8. The composition of claim 6, wherein said functional group is —CH$_2$—OP(O)(OH)$_2$.

9. The composition of claim 5, wherein said liquid crystal polymer resin is present in the amount of 0.5–15 wt % based on combined weights of liquid crystal polymer resin, functionalized fluoropolymer resin, and non-functional fluoropolymer resin present.

* * * * *